May 18, 1926.
R. H. TALBUTT
ROASTER
Filed Feb. 20, 1926     6 Sheets-Sheet 1
1,585,437
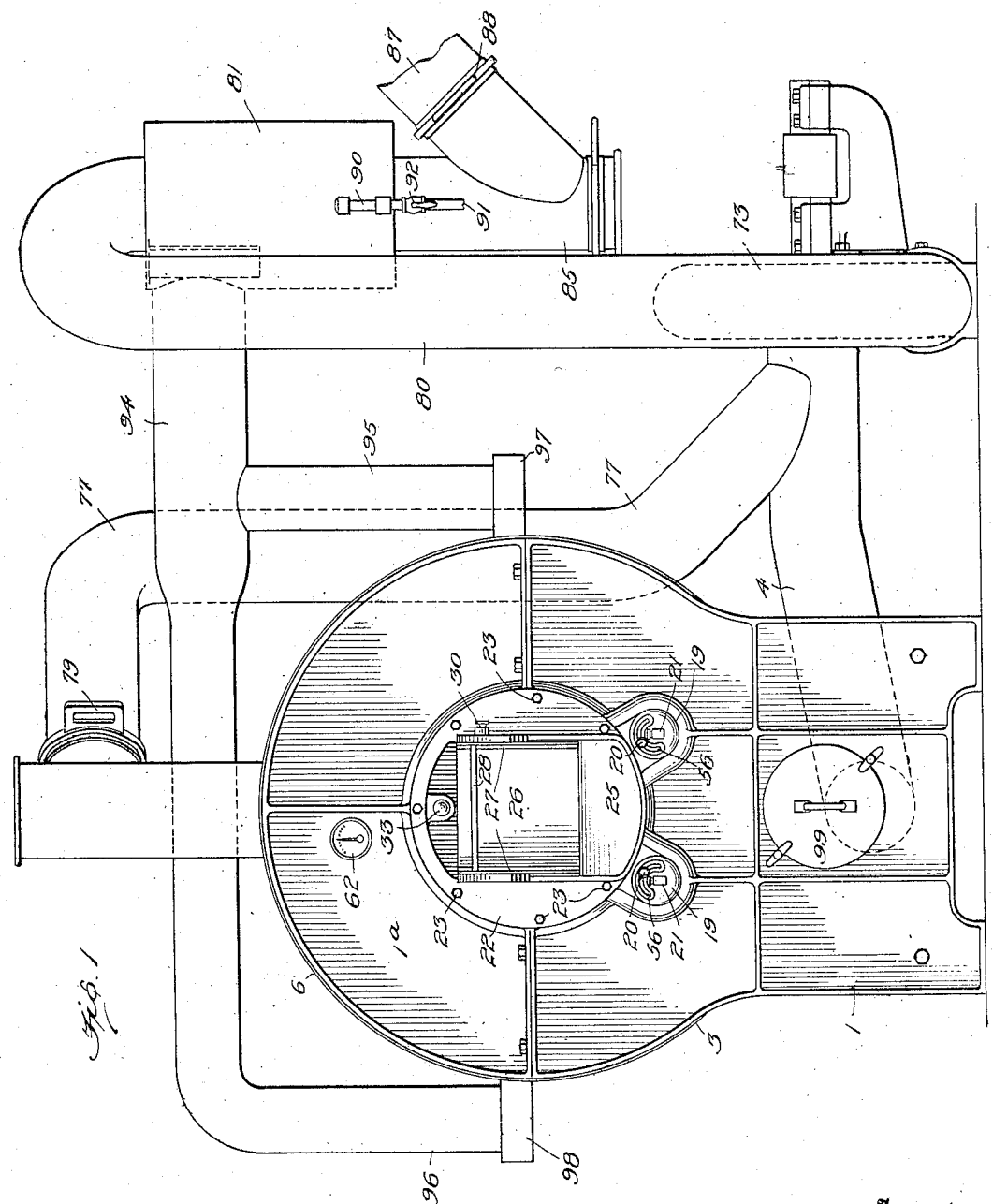
Inventor
Robert H. Talbutt
By
Attorney

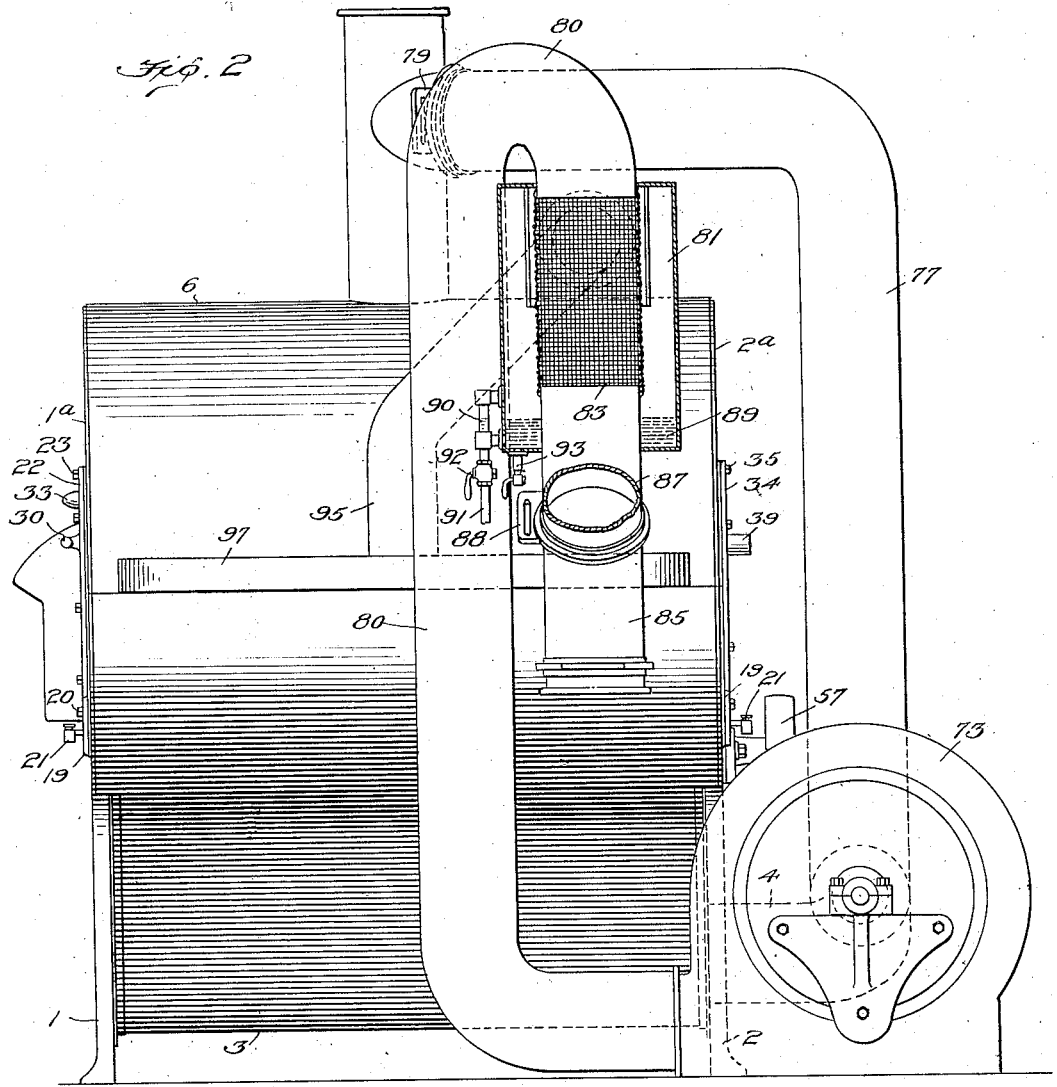

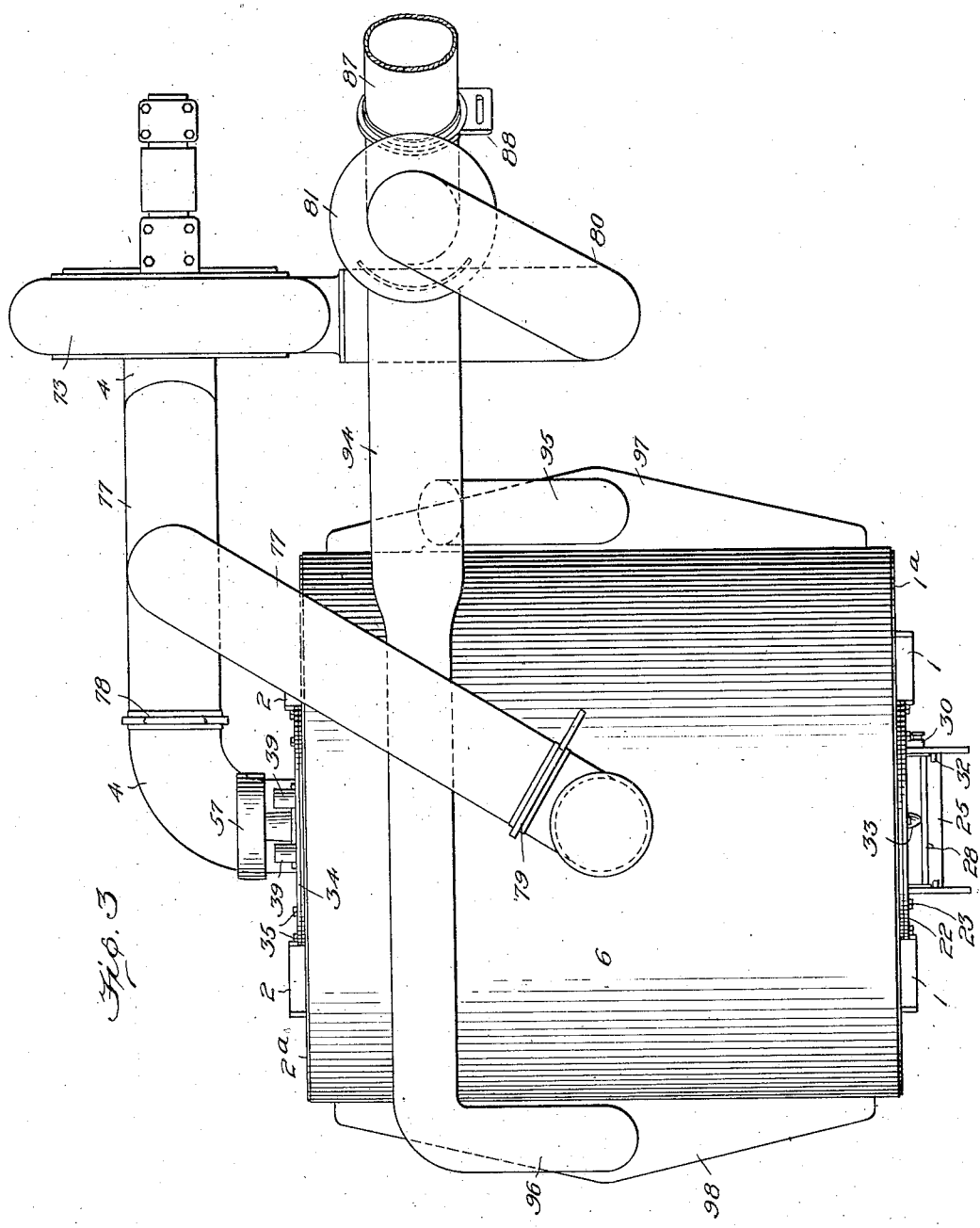

May 18, 1926. 1,585,437
R. H. TALBUTT
ROASTER
Filed Feb. 20, 1926   6 Sheets-Sheet 4
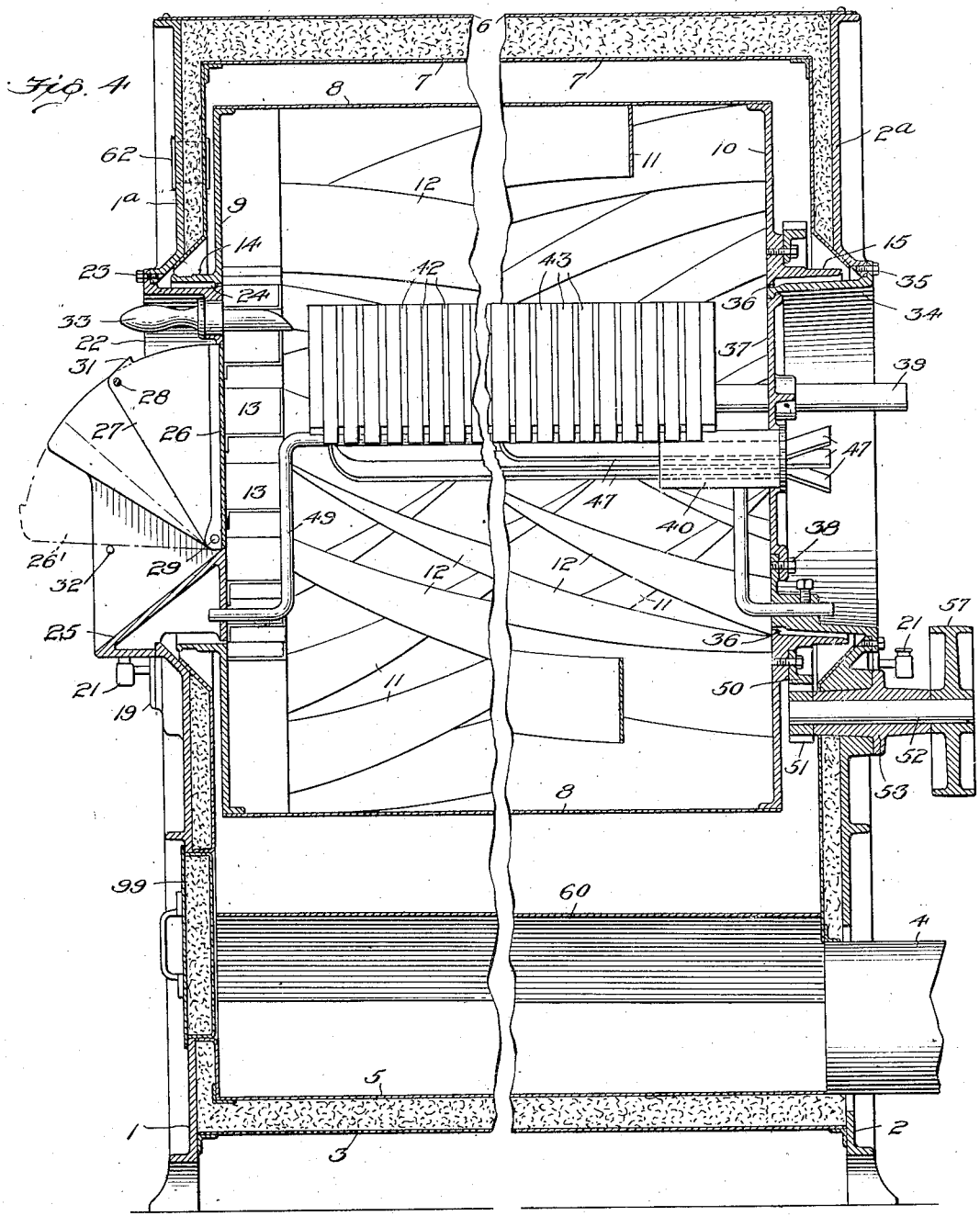
Inventor
Robert H. Talbutt
By [signature]
his Attorney May 18, 1926.
R. H. TALBUTT
ROASTER
Filed Feb. 20, 1926      6 Sheets-Sheet 5
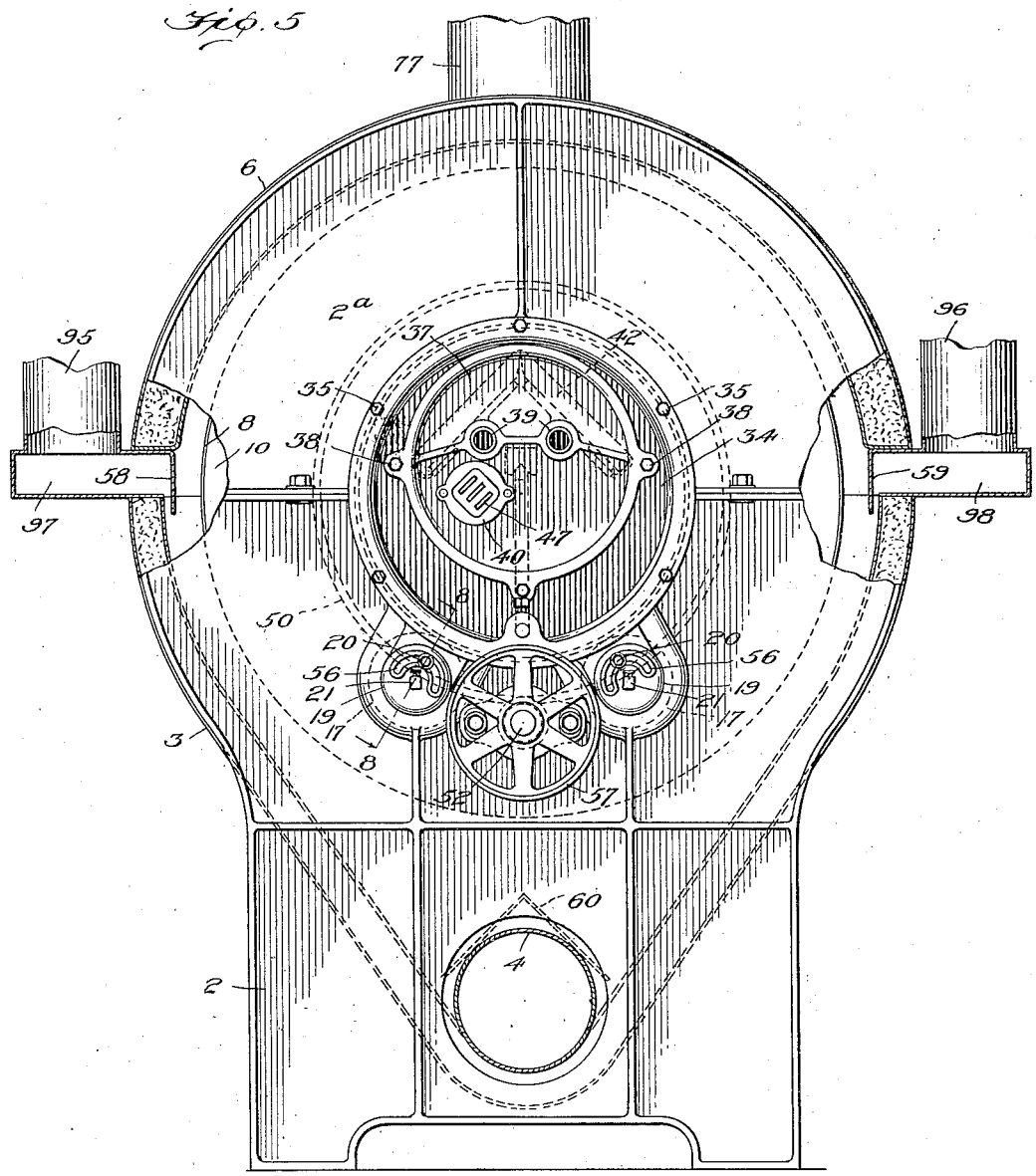
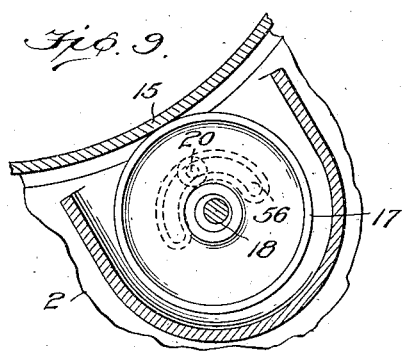
Inventor
Robert H. Talbutt
By
Attorneys May 18, 1926.
R. H. TALBUTT
ROASTER
Filed Feb. 20, 1926
1,585,437
6 Sheets-Sheet 6
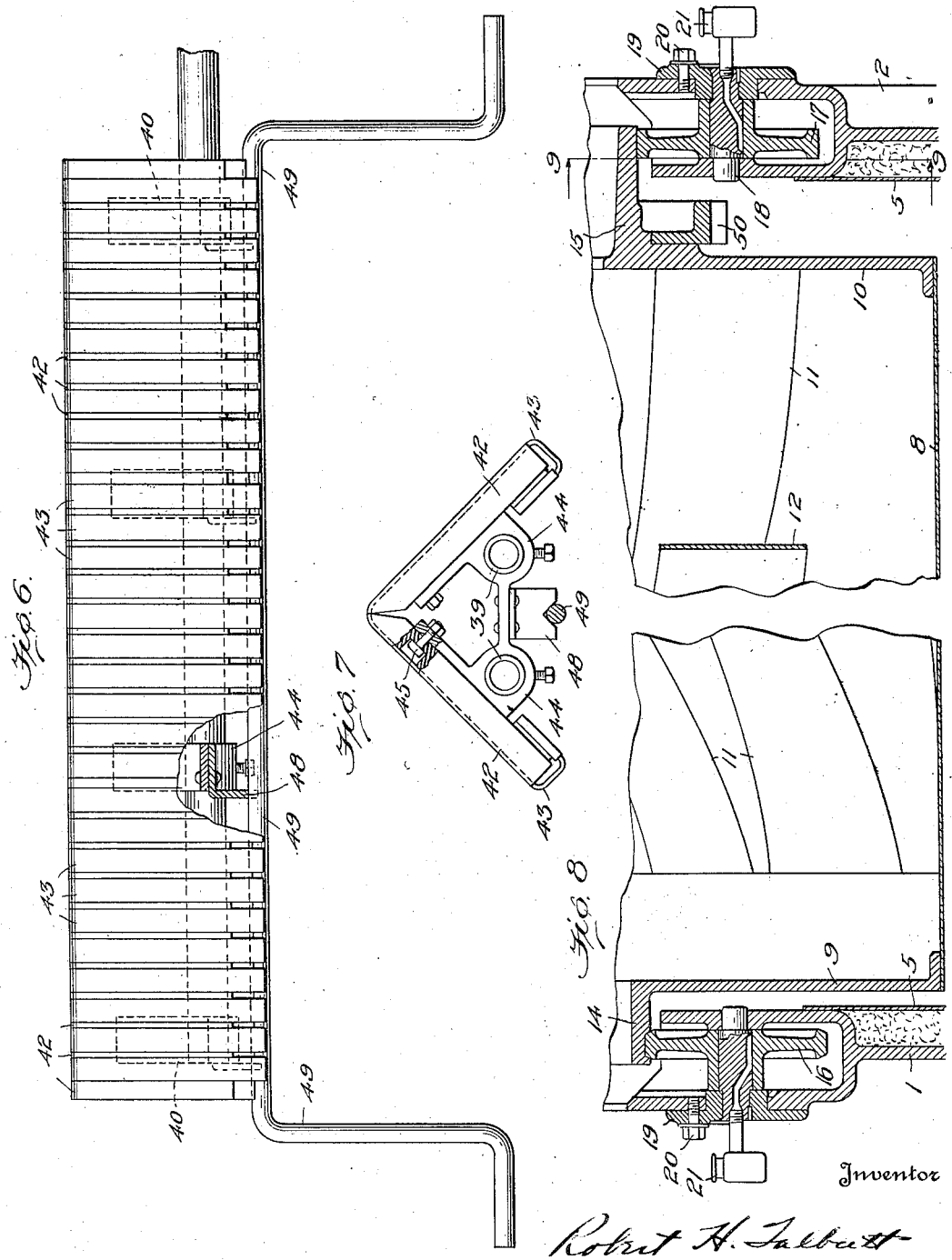
Inventor
Robert H. Talbutt
By
his Attorney Patented May 18, 1926.

1,585,437

UNITED STATES PATENT OFFICE.

ROBERT H. TALBUTT, OF BALTIMORE, MARYLAND.

ROASTER.

Application filed February 20, 1926. Serial No. 89,745.

This invention relates to improvements in roasters of that type wherein a rotary container or roasting cylinder is located within an outer insulating shell or frame.

One object of the invention is to provide a machine competent to roast material by the use of electric heating elements so arranged within the roasting cylinder as to secure a roasting by direct heat from the heating element instead of heat projected from a radiating surface which in turn is adapted to be heated in some suitable way. In this connection means are also provided for reflecting or returning heat units, by radiation, to the roasting cylinder, thereby preventing the loss of heat units and consequently increasing the efficiency of the apparatus.

The electric heating element is preferably removable and a further object is to support said element within the cylinder in suchwise as to provide a bearing for the innermost end of the heating elements at all points throughout their length of the cylinder. With this arrangement the inner end of the heating element will be supported within the casing at all points throughout its travel when it is being withdrawn from the roaster.

In most of the roasting machines the moisture-laden air together with the chaff is drawn from the roasting cylinder by a suction fan and the withdrawal of this air has a tendency to detract from the flavor or quality of the roasted product and at the same time to increase the heat consumption. In view of this the invention further contemplates an arrangement for separating the chaff from the air withdrawn from the roasting cylinder and returning this air to the roasting chamber so that practically none of the flavor of the bean is dissipated as would be the case if the air drawn from the roaster were discharged continuously to atmosphere. Provision is made to occasionally discharge moisture-laden air directly to atmosphere but ordinarily the process contemplates a return system of circulated air, accomplishing thereby conservation of aroma and higher thermal efficiency.

With these and other objects in view the invention consists in certain novel details of construction and arrangements and combinations of parts all as will hereinafter be more fully described and the novel features thereof particularly pointed out in the appended claims.

For the purpose of illustrating the present improvements there is shown an apparatus for roasting material such as coffee but it will be understood that the invention is applicable to other types of roasters.

In the accompanying drawings,—

Figure 1 is an end view of apparatus embodying the present improvements, some of the interior parts being shown in dotted lines.

Fig. 2 is an elevation of one side of the machine.

Fig. 3 is a top plan view.

Fig. 4 is a longitudinal sectional view, the central portion of the apparatus being broken away.

Fig. 5 is a view of the end opposite to that shown in Fig. 1.

Fig. 6 is a view of the heating unit removed from the roasting cylinder.

Fig. 7 is an end view of said unit.

Fig. 8 is a detail sectional view on the line 8—8 of Fig. 5; and

Fig. 9 is a similar view on the line 9—9 of Fig. 8.

In the preferred construction of roaster the apparatus is supported upon suitable end standards 1, 2, which extend from the floor up to substantially the center of the roasting cylinder. If desired, these end frames could be in proper spaced relation by suitable tie bolts but it is preferred that they be held by the casing 3 which extends from one standard to the other and is rigidly fastened to each of said standards by suitable fastening means such as bolts. Spaced from the interior of casing 3 is a lining 5, the cross sectional contour of the frame composed of this casing and lining being substantially circular except that the bottom portion is tapered downwardly, terminating in a rounded base portion. Exhaust pipe 4 which leads from the bottom of said casing is one of two outlets which may be used for withdrawing air from the interior of the frame as will later be described. This lining 5 is also connected to the end standards and the space between said lining and casing as well as the space between said lining and the standards 1, 2, is filled with some suitable heat insulating material. Rigidly mounted upon the upper surfaces of the end standards are the upper frame members 1ª, 2ª, these upper frame members and the standards substantially forming the ends of the roaster. Bridging the space between the upper frame members 1ª, 2ª, is the casing 6 fastened to said frames by rivets or bolts and within said casing there is a lining 7 also fastened at each of its ends to the upper frames. As in the case of either casing 3 and lining 5 the space between this upper casing 6 and lining 7 is also filled with suitable heat insulating material.

Within this exterior casing composed of the end standards and frames and shells 3 and 6, is the roasting drum in the form of a perforated cylinder 8 having its ends closed by heads 9 and 10. The drum heads 9 and 10 are formed with hollow trunnions 14, 15, projecting outward into engagement with the peripheries of trunnion wheels 16, 17, journaled in the end standards. To permit longitudinal expansion of the drum, the trunnion at one end of the cylinder, preferably trunnion 14, has a circumferential groove in which the trunnion wheels 16 are received while the trunnion 15 at the opposite end of the cylinder has a plane periphery adapted to engage rollers 17 to allow for expansion of the cylinder when hot. Furthermore, both sets of wheels are adjustable radially of the drums from the exterior of the roaster so as to insure proper support for the drum. A convenient arrangement for rendering the rollers adjustable is to journal said rollers on shafts 18, having enlarged bearing surfaces which are eccentric to the reduced ends journaled in the frame, so that by rotating the shafts the center of rotation of the rollers may be moved toward or from the center of the roasting cylinder. On the exterior end of each shaft 18 there is a collar 19 having an arcuate slot 56 therein through which extends a clamping bolt 20 threaded into the frame for holding said shaft in any adjacent position. The drum is adapted to roll upon these trunnion wheels, said drum being rotated by power applied to pulley 57 fast on a drive shaft 52 journaled in a bushing 53 in the rear frame. This shaft 52 projects within the casing 5 and at its inner end is provided with a pinion 51 meshing with a ring gear 50 on the drum head 10. The trunnion wheels 16, 17, are housed in suitable pockets in the frames 1 and 2 and are adapted to be lubricated by lubricant fed from oil cups 21.

The roasting drum and the exterior insulating frame are formed with an opening at one end for charging the cylinder with material to be roasted and for discharging it after the latter has been roasted. The closure for this opening consists of a flanged thimble 22 fastened to the front end frame 1, 1', by means of screws 23. Said thimble extends inwardly of the casing to a point in line with the inner face of drum head 9 suitable clearance between the trunnions 14 of said drum head and the thimble 22 being provided at 24. Thimble 22 is formed with an outwardly directed chute 25 adjacent an opening in said thimble, and said opening is provided with a door 26 which has outwardly extending sides 27 reinforced by the hand bar 28. The door 26 is adapted to swing or pivot on pins 29 but is held in closed position by means of a spring plunger 30 (see Fig. 1). The sides 27 of the door have lugs 31 which contact against the inner walls of thimble 22 when the door is moved into its discharge position. When the door is in charging position, as shown in dotted lines at 26' (Fig. 4) a pin 32 acts as a stop for engaging the door and limiting its outward movement. The thimble 22 is also provided with a comparatively small aperture in which a sample scoop 33 may be placed so as to project into the interior of the roasting drum or cylinder. When the scoop is not to be used it should be turned upside down so as to prevent accumulation of the material therein.

At the opposite end of the roaster there is a flanged thimble 34 fastened to the rear frame, 2, 2'' by screws 35. This thimble also extends inward to a point in line with the inside face of drum head 10, suitable clearance between said thimble 34 and the trunnion 15 being provided at 36. The opening in this thimble is closed by a cover plate 37 fastened to the inner wall of said thimble by screws 38. Projecting through suitable holes in thimble 34 are a plurality of supporting bars or pipes 39 on which are adapted to be mounted the heating elements for roasting the material. This heating unit is preferably composed of slabs of suitable insulating material 42, such as soapstone or the equivalent thereof and said slabs are grooved or corrugated to provide depressions for the reception of the ribbon-like heating elements 43. These slabs of insulating material 42 are arranged in substantially V-like formation and are connected to or supported upon expansion bridges 44 to which they are fastened by means of bolts 45. Preferably, the bolts 45 extend into the stones at the centers of the grooves, the openings between the tops of the heads of bolts 45 and the bottoms of the heating ribbons 43 being filled with some fire resisting material. To support the slabs 42 on the supporting bars 39 the several bridges 44 are formed with eyes or apertures through which said supporting bars extend. For supplying electricity to the heating elements 43 there is a flanged bushing 40 projecting through the cover plate, said bushing being lined with suitable insulating material to protect the buss bars 47 which extend to suitable controlling appliances on a switch board arranged at some convenient point through bushing 40 to the interior of the roasting cylinder where they are connected to the heating elements 43.

As has been described the bars or pipes 39 for supporting heating elements extend through and are fastened to the cover plate 37. In addition to this, one of the expansion bridges 44, preferably the one at the end of the heating element remote from cover plate 37, is provided with a bracket or plate 48 in the bottom of which there is a groove or V-shaped recess in which is received a bar 49 rigidly fastened at one end in the thimble 34 and slidably mounted at its opposite end in a suitable aperture in thimble 22. With this construction it might be properly said that while the heating elements and slabs 42 are carried on the bars 49 they are actually supported at one end in the cover plate 37 and at their opposite or inner end on the bar 49 and as the latter extends substantially the full length of the interior of the roasting drum it will be seen that when bolts 38 are removed to permit removal of cover plate 37 and said cover plate together with supporting bars 39 are withdrawn the latter will be supported by bar 49 at all points throughout the length of the drum during its removal. It should also be stated that loose engagement of bar 49 with thimble 22 permits of contraction and expansion of said bar under temperature variations within the roasting chamber.

It will be noted that the entire heating element is exposed and will directly heat the material within the roasting cylinder, this heating effect being augmented by the provision of helical vanes 11, 12, on the interior of said cylinder. At the end of the machine adjacent door 26 these vanes terminate in inclined chutes 13 to facilitate discharge of the material from the cylinder. Preferably, the heating element is located centrally of the roasting cylinder and the linings 5, 7, are made of some suitable metal, such as copper, that will function to redirect the heat rays back to the roasting cylinder so that there is but a slight loss of heat units. Furthermore, by having the heating element exposed there is a roasting by direct heat as well as by the radiant heat reflected by the linings 5, 7.

To exhaust any moisture-laden air and the chaff from the roasting drum there is a suction blower 73 adapted to be driven by any suitable means such as a motor to which it is connected by any desired coupling means. This motor may also be adapted to drive pulley on shaft 52. The exhaust end of the blower is preferably connected to the interior of the insulating casing of the roaster both at the top by means of exhaust pipe 77 and at the bottom by means of the exhaust pipe 4, the flow of air and chaff through these two pipes being controlled by regulating valves 78, 79, respectively. The material removed from the roaster passes through either or both of the exhaust pipes 4 and 77 to the exhauster 73 and is then blown through a pipe 80 a portion of which is perforated and surrounded by a container 81. Beyond the perforated portion said pipe 80 terminates in what might be termed a sealing chamber 85 with which communicates a pipe 87 having a valve 88 therein. Communicating with container 81 is a duct 94 having branches 95, 96, to communicate with distributing chambers 97, 98, and the latter communicate at the opposite sides of the roaster with the space between the lining 5 and the roasting cylinder. The moisture laden air carrying the chaff will thus pass from the blower to the perforated portion 83 of pipe 80 at which point the chaff, due to its greater weight, will settle in the settling chamber 85, while the air, due to the lower pressure within the roaster, will pass through the screen into chamber or container 81 and from thence to duct 94 to the distributers 97, 98. From there it will be returned again to the roaster so that instead of any air escaping from the roaster to atmosphere substantially all of the air drawn from the roaster will be returned thereto with the result that there will be but little, if any, loss in the flavor or strength of the material being treated. To assist in arresting any dust that may be carried by the air passing through the perforated portion 83 of pipe 80, there is maintained a small supply of water 89 in the bottom of the container 81. The level of the water therein may be determined by a water gage 90, water being supplied to said container through pipe 91 which is controlled by a valve 92. A suitable drain pipe controlled by valve 93 is also provided for withdrawing the water from said container.

To facilitate the removal of chaff from the inner surface of the casing 5, the air supplied to said casing through pipes 95, 96 and distributors 97, 98 is directed against baffles 58, 59 as it enters said casing with the result that it is deflected against said surface and in order to aid in maintaining a flow of air over said surface an elongated baffle 60 is mounted in said casing near the exhaust pipe 4. This tends to prevent the setting up of air currents through the central part of the casing and requires that practically all of the air exhausted be drawn along the bottom of said casing which would practically insure against the accumulation of chaff in said bottom. Furthermore, in order that air currents of sufficient strength be maintained at the end of the casing remote from pipe 4 instead of the greater portion of air passing baffle 60 at the end nearest said pipe, the remote end of the baffle is spaced from the casing a distance greater than the end nearest said pipe. This will permit a greater volume of air to pass the remote end of said baffle and create a stronger draft or current.

In operation the current is turned on full so as to heat the slabs of soapstone rapidly until the desired temperature within the roaster is obtained whereupon the current may be decreased to a point only necessary to maintain the proper roasting temperature. While the roaster is heating up, door 26 should be opened as shown at 26' and a batch of material charged through the door 26. The material deposited within the roaster cylinder would naturally roll and remain, to a great extent, at the bottom of the drum but by the provision of the helical vane 11, 12, the material is not only materially mixed by being moved backward and forward but it is also carried around and upward to the top of the cylinder where it slides off to the vanes and falls down upon and over the inclined sides of the heating unit. The progress of the roast may be ascertained from time to time by withdrawing the sampler 33. If coffee is being roasted it is desirable to keep both exhaust pipe valves 78, 79 closed until the chaff begins to fall from the beans at which time said valves should be regulated to allow sufficient suction to carry the chaff off and convey it to the collector pipe 85. The hot air separates from the chaff and passes through duct 94 back to the chamber as before described. It will be obvious, from the foregoing description, that with this closed system for circulating the heated air, the aroma will not be lost by being discharged to the outside atmosphere. In addition, the heated air being returned to the roaster, there is a minimum loss of heat units thus increasing the thermal efficiency of the roaster. When the roast is completed door 26 is moved to position 26' and the vanes 11 will move the material into the chutes or pockets 13 from whence it will be precipitated through the open door 26 and down on the chute 25 from which point it may be conveyed to the regular cooling apparatus.

In accordance with the usual practice a door 99 is provided for the inspection and cleaning of the roasting drum.

What I claim is:—

1. In a roaster, the combination of an exterior insulating frame, an interior foraminous roasting chamber journaled in said frame, an electrical heating unit mounted in said frame and extending into the roasting chamber, said heating element being exposed to heat directly material within the chamber.

2. In a roaster, the combination of an exterior insulating frame, an interior foraminous roasting chamber journaled in said frame, an electrical heating unit mounted in said frame and extending into the roasting chamber, said heating element being exposed to heat directly material within the chamber and a radiating element surrounding said chamber adapted to heat the contents of the latter by redirecting into said chamber heat units projected from the heating elements.

3. In a roaster, the combination of an exterior insulating frame, an interior foraminous roasting cylinder journaled in said frame, an electrical heating unit mounted in the frame and extending centrally of the roasting chamber, means for directing the material into contact with the heating element for directly heating the latter, and a cylindrical heat radiating material surrounding the cylinder for radiating heat units from the heating elements back to the material within the roasting cylinder.

4. In a roaster, the combination of an exterior insulating frame having an opening therein, a cover for said opening detachably secured to the frame, a roasting cylinder journaled in the frame, an electrical heating unit supported at one end by said cover and extending fully exposed into the roasting cylinder, and means within said cylinder on which the heating element will be slidably supported when the latter is moved longitudinally of the cylinder to remove it from the latter.

5. In a roaster, the combination of an outer insulating frame, a roasting cylinder journaled in said frame, a supporting bar mounted in one end of said frame, an electrical heating unit mounted at one end on said bar and extending longitudinally of the roasting cylinder, and a supporting rod mounted in said frame, the free end of said heating element being supported on said rod.

6. In a roaster the combination of an outer insulating frame, a roasting cylinder journaled in said frame, a plurality of bars mounted in one end of said frame, an electrical heating unit mounted at one end on said bars and extending longitudinally of the roasting cylinder, and a supporting rod mounted at one end in one end of said frame, and loosely supported at its opposite end in said frame to compensate for expansion and contraction, the free end of the heating element being slidably supported on said rod.

7. In a roaster, the combination of an exterior insulating frame having an opening in one end, a cover for said opening, a roasting cylinder journaled in said frame, an electrical heating element extending longitudinally of the roasting cylinder, one end of said heating element being supported by the cover for said opening, and the other end of said heating element being slidably supported indirectly from the frame proper.

8. In a roaster, the combination of an exterior insulating frame having an opening in one end, a cover for said opening, a roasting cylinder journaled in the frame, an electrical heating element extending longitudinally within the cylinder, a support on which one end of said heating element is slidably mounted within the cylinder and a connection between the opposite end of said heating element and said cover whereby said cover and heating element may be removed as a unit with the element riding freely on its support within the cylinder.

9. In a roaster, the combination of an exterior insulating frame having an opening therein, a cover for said opening, a roasting cylinder journaled in said frame, a heating element extending longitudinally of the cylinder, said element having a groove in its bottom, a support carried by the cover for one end of the heating element, and a second support extending longitudinally of the cylinder cooperating with the groove in the bottom of the heating element to slidably support said element when the latter is withdrawn through the opening in the end of the frame.

10. In a roaster, the combination of an exterior insulating frame, an interior foraminous rotatable roasting cylinder, a suction blower, a duct leading from the interior of said frame to the exhaust side of the blower for withdrawing chaff from the roasting cylinder, a duct leading from said blower back to the interior of the insulating frame, and means interposed in said last duct for extracting the chaff while permitting the air to return to said frame.

11. In a roaster, the combination of an exterior insulating frame, an interior foraminous rotatable roasting cylinder, a suction blower, a duct leading from the interior of said frame to the exhaust side of the blower for withdrawing chaff from the roasting cylinder, a duct leading from said blower back to the interior of the insulating frame and arranged to direct the returned air against the inclined lower portions of the walls of the roasting cylinder, and means interposed in said last duct for extracting the chaff while permitting the air to return to said frame.

12. In a roaster, the combination of an exterior insulating frame, an interior foraminous rotatable roasting cylinder, a suction blower, ducts leading from the top and bottom of said frame to the exhaust side of the blower for withdrawing air and chaff from the roasting cylinder, a duct leading from the blower back to said frame and communicating with the interior of said frame at opposite sides of the latter, and means interposed in said duct leading back to the frame for extracting the chaff while permitting the air to return to the interior of said frame.

13. In a roaster, the combination of an exterior insulating frame, an interior foraminous rotatable roasting cylinder, a suction blower, a duct leading from the interior of said frame to the exhaust side of the blower for withdrawing chaff and air from the roasting cylinder, a duct leading from said blower back to the interior of the insulating frame, and means in said last mentioned duct for extracting the chaff from the air before the latter returns to the interior of the frame, said chaff extracting means comprising a settling chamber having a portion of its wall perforated and a container surrounding the perforated portion of said chamber whereby chaff may settle in said chamber while the air passes to the container, said chamber being in communication with said blower and the container being in communication with the interior of the frame.

14. In a roaster, the combination of an exterior insulating frame, an interior foraminous rotatable roasting cylinder, a suction blower, a duct leading from the interior of said frame to the exhaust side of the blower for withdrawing chaff and air from the roasting cylinder, a duct leading from said blower back to the interior of the insulating frame, means in said last mentioned duct for extracting the chaff from the air before the latter returns to the interior of the frame, said chaff extracting means comprising a settling chamber having a portion of its wall perforated and a container surrounding the perforated portion of said chamber whereby chaff may settle in said chamber while the air passes to the container, said chamber being in communication with said blower and the container being in communication with the interior of the frame, and means for maintaining a supply of liquid in said chamber.

15. In a roaster, the combination of a supporting frame, a rotatable container for material to be roasted, trunnions on the ends of said containers, and trunnion rollers journaled in said frame on which said trunnions are supported, the cooperating peripheries of said trunnions and rollers at one end of the container interlocking with each other to prevent movement of the container with respect to said rollers longitudinally of the container.

16. In a roaster, the combination of a supporting frame, a rotatable container for material to be roasted, trunnions on the ends of said containers, and trunnion rollers journaled in said frame on which said trunnions are supported, the cooperating peripheries of said trunnions and rollers at one end of the container interlocking with each other to prevent movement of the container with respect to said rollers longitudinally of the container, the trunnion and rollers at the other end of said container having plane cooperating peripheries to permit longitudinal expansion of said container.

17. In a roaster, the combination of a supporting frame, a rotatable container for material to be roasted, trunnions on the ends of said containers, and trunnion rollers journaled in said frame on which said trunnions are supported, the trunnion at one end of said container having a groove therein in which is received the cooperating rollers and the peripheries of the trunnion and rollers at the opposite end of the container being plane.

18. In a roaster, the combination of a supporting frame, a rotatable container for material to be roasted, trunnions on the ends of said containers, and trunnion rollers journaled in said frame on which said trunnions are supported, means for permitting longitudinal expansion of the container, and said trunnion supporting rollers being adjustable toward and from the axis of rotation of said container.

19. In a roaster, the combination of a supporting frame comprising an exterior insulating casing, an inner foraminous rotatable roasting cylinder, and trunnions at the ends of said cylinder, supporting rollers for said trunnions journaled in the supporting frame, said supporting rollers being adjustable radially of the roasting cylinder from the exterior of the insulating casing and frame.

20. In a roaster, the combination of an exterior insulated casing, an interior rotatable roasting cylinder, a suction blower, and a closed air circulating system connected to said blower and communicating with the interiors of said cylinder and casing.

21. In a roaster, the combination of an exterior insulating casing, an interior rotatable roasting cylinder, a suction blower, and a closed air circulating system connected to said blower and comunicating with the interiors of said cylinder and casing, said system comprising a duct through which the chaff ladened air may be withdrawn from the bottom of said casing and cylinder and a separate duct through which air may be withdrawn from the upper portion of said casing cylinder.

22. In a roaster, the combination of an exterior insulating casing, an interior rotatable roasting cylinder, a suction blower, and a closed air circulating system connected to said blower and communicating with the interiors of said cylinder and casing, said system comprising a duct through which the chaff ladened air may be withdrawn from the bottom of said casing and cylinder and a separate duct through which air may be withdrawn from the upper portion of said casing cylinder, and means for adding moisture to the chaff ladened air after it has been drawn from said casing.

23. In a roaster, the combination of an exterior insulating casing, an interior rotatable roasting cylinder, a suction blower, and a closed air circulating system connected to said blower and communicating with the interiors of said cylinder and casing said system comprising a duct through which the chaff ladened air may be withdrawn from the bottom of said casing and cylinder and a separate duct through which air may be withdrawn from the upper portion of said casing and cylinder, and a third duct through which the air is returned to said casing at a point in proximity to the lower inclined portions of the wall of said cylinder.

24. In a roaster, the combination of an exterior frame, an interior rotatable foraminous roasting chamber journaled in said frame, an electrical heating unit mounted in said roasting chamber and extending substantially centrally thereof, and a radiating element surrounding said chamber and heating element whereby material within said chamber will receive heating units directly and indirectly from said electrical unit.

25. In a roaster, the combination of an exterior frame or casing, an interior foraminous roasting cylinder journaled in said frame, an electrical heating unit mounted in said cylinder from which material is directly heated, and means extending around said heating unit by which said material is indirectly heated by said unit.

26. In a roaster, the combination of an exterior casing, an interior rotatable roasting chamber within the frame, means for supplying air to said casing, said means comprising a conduit communicating with the interior of said casing and means for deflecting the air supplied by said conduit against the walls of the casing to prevent accumulation of chaff thereon.

27. In a roaster, the combination of a roasting cylinder, an elongated casing in which said cylinder is enclosed, an air supply connection communicating with the interior of the casing, an exhaust connection at one end of said casing, and a baffle extending lengthwise of the casing and spaced from the side walls thereof, the end of the baffle remote from the exhaust connection being spaced from said wall a greater distance than the end nearest said connection.

28. In a roaster, the combination of a roasting cylinder, an elongated casing in which said cylinder is enclosed, air supply connections communicating with said casing, an exhaust connection leading from said casing, and a baffle within said casing between the air inlet and exhaust for maintaining a flow of air throughout substantially the entire length of said casing.

29. In a roaster, the combination of a roasting cylinder, an elongated casing in which said cylinder is enclosed air supply connections communicating with said casing, an exhaust connection leading from said casing, and means within said casing for directing the air supplied to the casing along the bottom thereof to said exhaust connection.

30. In a roaster, the combination of a roasting cylinder, an elongated casing enclosing said cylinder, a conduit for supplying air to the interior of the casing, means for deflecting such air against the sides of the casing, an exhaust conduit, and means for requiring the air to flow along the sides of the casing near the bottom thereof and along the bottom of the same.

31. In a roaster, the combination of a roasting cylinder, an elongated casing enclosing said cylinder, a conduit for supplying air to the interior of the casing at a point above the bottom of said cylinder, a baffle for directing such air against the sides of the casing, an exhaust duct leading from the bottom of the casing, and a baffle near the bottom of said casing and extending lengthwise thereof, whereby air currents will be maintained throughout substantially the entire bottom of said casing.

32. In a roaster, the combination of a roasting cylinder, an elongated casing enclosing said cylinder, a conduit for supplying air to the interior of the casing at a point above the bottom of said cylinder, a baffle for directing such air against the sides of the casing, an exhaust duct leading from the bottom of the casing, and a baffle near the bottom of said casing and extending lengthwise thereof, the end of said baffle remote from the exhaust duct being spaced from the sides of the casing a greater distance than the end nearest said duct.

ROBERT H. TALBUTT.